(12) United States Patent
Patel et al.

(10) Patent No.: US 10,180,035 B2
(45) Date of Patent: Jan. 15, 2019

(54) SOLDERED COMPONENTS FOR DOWNHOLE USE

(71) Applicants: Schlumberger Technology Corporation, Sugar Land, TX (US); University of Maryland, College Park, College Park, MD (US)

(72) Inventors: Chandradip Pravinbhai Patel, Stafford, TX (US); Mark Alex Kostinovsky, Houston, TX (US); Francis Dupouy, Stonehouse (GB); Glen Dell Schilling, Richmond, TX (US); Gilles Iafrate, Clamart (FR); F. Patrick McCluskey, Ellicott City, MD (US)

(73) Assignees: SCHLUMBERGER TECHNOLOGY CORPORATION, Sugar Land, TX (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 755 days.

(21) Appl. No.: 14/656,198

(22) Filed: Mar. 12, 2015

(65) Prior Publication Data

US 2015/0184467 A1 Jul. 2, 2015

Related U.S. Application Data

(63) Continuation-in-part of application No. 14/231,009, filed on Mar. 31, 2014.

(Continued)

(51) Int. Cl.
*B23K 1/00* (2006.01)
*E21B 17/02* (2006.01)
(Continued)

(52) U.S. Cl.
CPC .......... *E21B 17/028* (2013.01); *B23K 1/0008* (2013.01); *B23K 1/20* (2013.01); *B23K 35/0244* (2013.01); *B23K 35/262* (2013.01)

(58) Field of Classification Search
CPC ..................................................... E21B 17/028
See application file for complete search history.

(56) References Cited

U.S. PATENT DOCUMENTS 3,667,099 A 6/1972 Palmer et al.
3,990,094 A 11/1976 Konantz et al.
(Continued)

FOREIGN PATENT DOCUMENTS

CN 101513697 A 8/2009
CN 102240870 A 11/2011
(Continued)

OTHER PUBLICATIONS

Liu, W. et al., "The Effects of Additives to SnAgCu Alloys on Microstructure and Drop Impact Reliability of Solder Joints", Journal of the Minerals, Metals & Materials Society, Jul. 2007, 59(7), pp. 26-31.
(Continued)

*Primary Examiner* — Brad Harcourt
*Assistant Examiner* — David Carroll

(57) ABSTRACT

The disclosure describes soldering a first component (200) to a second component (226) for use in a downhole circuit, device and/or tool. The first component (200) includes an electrically conductive contact region (402) finished with a metallic finish layer (404). The soldering includes disposing a layer of manganese (408) adjacent to the metallic finish layer (404), and applying solder (406) to the layer of manganese (408). The solder (406) used in the soldering of the two components is a mixture of copper, silver and tin.

30 Claims, 12 Drawing Sheets

Related U.S. Application Data

(60) Provisional application No. 61/836,743, filed on Jun. 19, 2013, provisional application No. 61/812,537, filed on Apr. 16, 2013, provisional application No. 61/807,193, filed on Apr. 1, 2013.

(51) Int. Cl.
*B23K 1/20* (2006.01)
*B23K 35/26* (2006.01)
*B23K 35/02* (2006.01)

(56) References Cited

U.S. PATENT DOCUMENTS

| | | | |
|---|---|---|---|
| 4,869,757 A | 9/1989 | Eagar et al. | |
| 5,405,577 A | 4/1995 | Seelig et al. | |
| 5,536,908 A | 7/1996 | Etchells et al. | |
| 6,047,876 A | 4/2000 | Smith | |
| 2003/0196732 A1 | 10/2003 | Carey, II et al. | |
| 2005/0031483 A1 | 2/2005 | Liu et al. | |
| 2005/0100474 A1 | 5/2005 | Huang et al. | |
| 2007/0134125 A1* | 6/2007 | Liu | C22C 13/00 420/560 |
| 2007/0212817 A1 | 9/2007 | Sato et al. | |
| 2008/0159904 A1 | 7/2008 | Lewis et al. | |
| 2008/0265006 A1* | 10/2008 | Yu | B23K 1/0016 228/203 |
| 2008/0292492 A1 | 11/2008 | Ingham et al. | |
| 2010/0084050 A1 | 4/2010 | Kraemer et al. | |
| 2011/0052444 A1* | 3/2011 | Hrametz | B23K 35/262 420/504 |
| 2011/0281136 A1* | 11/2011 | Duh | B23K 35/302 428/674 |
| 2012/0280023 A1 | 11/2012 | Amin et al. | |
| 2012/0328361 A1 | 12/2012 | Liu et al. | |
| 2014/0290931 A1 | 10/2014 | Patel et al. | |
| 2015/0184467 A1 | 7/2015 | Patel et al. | |
| 2015/0224604 A1 | 8/2015 | Choudhury et al. | |
| 2015/0236438 A1 | 8/2015 | Rateiczak et al. | |

FOREIGN PATENT DOCUMENTS

| | | |
|---|---|---|
| EP | 1889684 A1 | 2/2008 |
| EP | 1977022 A2 | 10/2008 |
| JP | 2006289493 A | 10/2006 |
| WO | WO2007070548 A2 | 6/2007 |

OTHER PUBLICATIONS

Search Report in European Patent Application No. 15158881.1 dated Sep. 28, 2015, 7 pages.
Search Exam in European Patent Application No. 15158881.1 dated Mar. 7, 2018, 7 pages.
Search Exam in European Patent Application No. 15158881.1 dated Jul. 6, 2017, 6 pages.

* cited by examiner

SOLDERED COMPONENTS FOR DOWNHOLE USE

CROSS-REFERENCE TO RELATED APPLICATIONS

The present application is a continuation-in-part of patent Ser. No. 14/231,009, filed on Mar. 31, 2014, which claims the benefit of related U.S. Provisional Patent Application Ser. No. 61/807,193, filed on Apr. 1, 2013, entitled "High Temperature Solder for Downhole Components," related U.S. Provisional Patent Application Ser. No. 61/812,537, filed Apr. 16, 2013, entitled "High Temperature Solder for Downhole Components," and related U.S. Provisional Patent Application Ser. No. 61/836,743, filed Jun. 19, 2013, entitled "High Temperature Solder for Downhole Components," the disclosures of which are all incorporated by reference herein in their entireties for all purposes.

BACKGROUND

Solder is used to connect, electrically and mechanically, electrical components of downhole tools used in relation to well sites in connection with hydrocarbon exploration and acquisition. For instance, joints may be created by melting the solder between the surfaces to be joined, and then allowing it to solidify, thereby forming the joint. Traditionally tin-lead (HMP) solders have long been used for their high melting point, narrow melting range, fair wetting, reliability, availability and cost advantages. However, the EU Restriction of Hazardous Substances (RoHS) legislation has banned most lead from electronics, which has consequently led to development of lead-free alternatives to tin-lead solder. Many attempts at finding alternatives for high temperature applications focused on tin-silver-copper alloys (also known as Sn—Ag—Cu alloys, or SAC alloys), due to their higher melting temperature.

Lower silver content SAC alloys, such as Sn-1.0Ag-0.5Cu (SAC105), have been found to perform well in high shock and vibration environments (e.g., exhibiting longer joint life), while higher silver content SAC alloys, such as Sn-4.0Ag-0.5Cu (SAC405), have been found to perform well in high temperature applications (e.g., temperatures (T)>125° C.). While all of these solders have melting temperatures in the range of 215° C.-225° C., those with lower silver content were found to be more resistant to failure by shock and vibration, but also less resistant to failure by creep, temperature aging, or temperature cycling compared to those with higher silver content. With this in mind, Sn-3.0Ag-0.5 Cu (SAC305) has been found to exhibit a compromise between SAC105 and SAC405, and has found widespread usage in many applications. However, the long-term reliability of SAC305 is questionable under harsh environments, particularly those combining high temperature thermal fatigue with mechanical shock/vibration.

It is known to provide a contact surface of a component with a finish layer. The finish, also known as plating or coating, serves to protect the contact surface from oxidation, for example on a lead or termination of the component or a solder pad of a printed wiring board, thereby prolonging shelf life as well as facilitating the assembly process by providing a compatible soldering surface onto which solder can be applied. Additionally, many finishes also form or provide a diffusion barrier that minimizes further interaction of the solder with the metal of the contact surface. However, when exposed to high temperatures for an extended period of time, the diffusion barrier capability of this layer is decreased or eliminated, and the solder reacts with the metal of the contact surface. In this respect, it has been found that during exposure to heat after soldering, i.e. when in use, an interfacial intermetallic layer forms between the finish layer and the solder, as a result of this reaction between the solder and the metal of the contact surface, which reduces the bonding strength of the solder joint as this layer continues to grow.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to a first aspect of embodiments of the present disclosure, a method is provided for soldering a first component to a second component. The first component comprises an electrically conductive contact region, comprising a metallic finish layer, and a layer of manganese coupled with this metallic finish layer. To couple the manganese with the metallic finish layer, the manganese is configured to be in electrical communication with the metallic finish layer. Merely by way of example, the manganese layer may be disposed in contact with the metallic finish layer, disposed on top of the metallic finish layer, disposed adjacent to the metallic finish layer and/or the like. A solder—comprising copper, silver and tin—is applied to the layer of manganese to solder the two components together.

In some embodiments of the present disclosure, the layer of manganese may be disposed using at least one of an electroless plating technique, an electroplating technique, an RF sputtering technique, or a chemical vapor deposition technique.

In some embodiments of the present disclosure, the layer of manganese may be disposed using at least one of a metallic preform technique, a metallic film technique, a metallic powder deposition technique or a metallic sheet solder.

In some embodiments, the finish layer may be an alloy comprising nickel as a diffusion barrier.

According to a second aspect of embodiments of the present disclosure, a method of soldering a first component to a second component is provided. The first component comprises an electrically conductive contact region that is finished with a finish layer of an alloy comprising nickel and manganese. A solder comprising copper, silver and tin is applied to the finish layer to solder the first and the second components together.

According to a third aspect of embodiments of the present disclosure, a downhole tool conveyable within a wellbore extending into a subterranean formation is provided that comprises a first component, a second component and a solder electrically and mechanically coupling the first and second components. The first component of the downhole tool comprises an electrically conductive contact region that is finished with a metallic finish layer and a layer of manganese disposed adjacent to the finish layer. The solder is disposed between the layer of manganese and the second component and comprises copper, silver and tin.

The second component may comprise another electrically conductive contact region finished with another metallic finish layer and another layer of manganese disposed adjacent to the another finish layer so that the solder coupled with the second component is disposed adjacent to the another layer of manganese.

In some embodiments of the present disclosure, the solder may have a melting point of at least about 150° C. In other embodiments, the solder may have a melting point of at least about 200° C. In further embodiments, the solder may have a melting point of at least 215° C. In yet further embodiments, the solder may have a melting temperature range from about 215° C. to about 225° C.

In some embodiments of the present disclosure, the first component may comprise a substrate and the second component may comprise an integrated circuit chip.

In some embodiments of the present disclosure, at least one of the first and second components may comprise at least a portion of at least one of: an analog-to-digital converter; an antenna; a capacitor; a charge pump; a connector; a controller; a cooling component; a digital logic gate; a digital-to-analog converter; a diode; a heating component; an inductor; an integrated circuit chip; a memory; a microelectromechanical system (MEMS); a microprocessor; a mixer; an operational amplifier; an oscillator; a programmable logic device (PLD); a receiver; a resistor; a sensor; a state machine; a switch; a temperature control component; a terminal; a transceiver; a transformer; a transistor; a voltage converter; a voltage reference; or another electrical device.

The downhole tool in accordance with aspects of the present disclosure may comprise at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; or a tough logging condition (TLC) tool.

The downhole tool may be conveyable within the wellbore by at least one of coiled tubing, drill pipe, slickline, wired drill pipe (WDP), or wireline.

The downhole tool may comprise at least one of a cased-hole tool or an open-hole tool.

In some embodiments of the present disclosure, the solder may comprise: from about 0.001 to about 1 percent, based on total weight of the solder, of copper; from about 2.5 to about 4 percent, based on total weight of the solder, of silver; from about 0.01 to about 0.25 percent, based on total weight of the solder, of manganese; and tin.

The solder alloy may consist essentially of: from about 0.001 to about 1.0 percent, based on total weight of the solder, of copper; from 2.5 to 4.0 percent, based on total weight of the solder, of silver; from 0.01 to 0.25 percent, based on total weight of the solder, of manganese; and tin. The remainder of the solder may comprise tin.

According to a fourth aspect of embodiments of the present disclosure, an apparatus is provided comprising a downhole tool conveyable within a wellbore extending into a subterranean formation, the downhole tool comprising a first component, a second component, and a solder electrically and mechanically coupling the first and second components. The first component comprising an electrically conductive contact region finished with a metallic finish layer comprising nickel and manganese and the solder, comprising copper, silver and tin, is disposed between the finish layer and the second component.

The second component may comprise another electrically conductive contact region finished with another metallic finish layer comprising nickel and manganese wherein the solder is adjacent the another finish layer.

The second component may comprise another electrically conductive contact region finished with another metallic finish layer and a layer of manganese adjacent the another finish layer, wherein the solder is adjacent the layer of manganese.

In some embodiments of the present disclosure, the solder may have a melting point of at least about 150° C. In other embodiments, the solder may have a melting point of at least about 200° C. In further embodiments, the solder may have a melting point of at least 215° C. In yet further embodiments, the solder may have a melting temperature range from about 215° C. to about 225° C.

In some embodiments of the present disclosure, the first component may comprise a substrate and the second component comprises an integrated circuit chip.

In some embodiments of the present disclosure, the at least one of the first and second components may comprise at least a portion of at least one of: an analog-to-digital converter; an antenna; a capacitor; a charge pump; a connector; a controller; a cooling component; a digital logic gate; a digital-to-analog converter; a diode; a heating component; an inductor; an integrated circuit chip; a memory; a microelectromechanical system (MEMS); a microprocessor; a mixer; an operational amplifier; an oscillator; a programmable logic device (PLD); a receiver; a resistor; a sensor; a state machine; a switch; a temperature control component; a terminal; a transceiver; a transformer; a transistor; a voltage converter; a voltage reference; or another electrical device.

The downhole tool may comprise at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; or a tough logging condition (TLC) tool.

The downhole tool may be conveyable within the wellbore by at least one of coiled tubing, drill pipe, slickline, wired drill pipe (WDP), or wireline.

The downhole tool may comprise at least one of a cased-hole tool or an open-hole tool.

In some embodiments of the present disclosure, the solder may comprise: from about 0.001 to about 1 percent, based on total weight of the solder, of copper; from about 2.5 to about 4 percent, based on total weight of the solder, of silver; from about 0.01 to about 0.25 percent, based on total weight of the solder, of manganese; and tin.

In some embodiments of the present disclosure, the solder alloy may consist essentially of: from about 0.001 to about 1.0 percent, based on total weight of the solder, of copper; from 2.5 to 4.0 percent, based on total weight of the solder, of silver; from 0.01 to 0.25 percent, based on total weight of the solder, of manganese; and tin. The remainder of the solder may comprise tin.

According to a fifth aspect of embodiments of the present disclosure, there is provided a method of soldering a first component to a second component, the first component having an electrically conductive contact region, the method comprising forming the electrically conductive contact region from an alloy containing manganese, finishing the electrically conductive contact region with a metallic finish layer and applying solder, the solder comprising copper, silver and tin, to the finish layer.

According to a sixth aspect of embodiments of the present disclosure, there is provided an apparatus comprising: a downhole tool conveyable within a wellbore extending into a subterranean formation, wherein the downhole tool comprises a first component; a second component; and a solder electrically and mechanically coupling the first and second components. The first component comprises an electrically conductive contact region formed from an alloy containing manganese, where the electrically conductive region is finished with a metallic finish layer; and a layer of manganese is disposed adjacent the finish layer. The solder is disposed between the finish layer and the second component, the solder comprising copper, silver and tin.

It is thus possible to provide an apparatus, and a method of soldering, which provide the benefit of improved solder joint reliability, for example in relation to printed wiring assemblies, when the solder joint is exposed to high temperatures, for example temperatures in excess of 150° C., for an extended period of time. In this regard, the use of manganese therefore enhances stability of the diffusion barrier layer and so obviates or at least mitigates the formation of additional interfacial intermetallic layers that serve to weaken the strength and reduce the reliability of the solder joint.

BRIEF DESCRIPTION OF THE DRAWINGS

The present disclosure is best understood from the following detailed description when read with the accompanying figures. In this respect, at least one embodiment of the invention will now be described, by way of example only, with reference to the accompanying drawings, in which.

Figure 1:
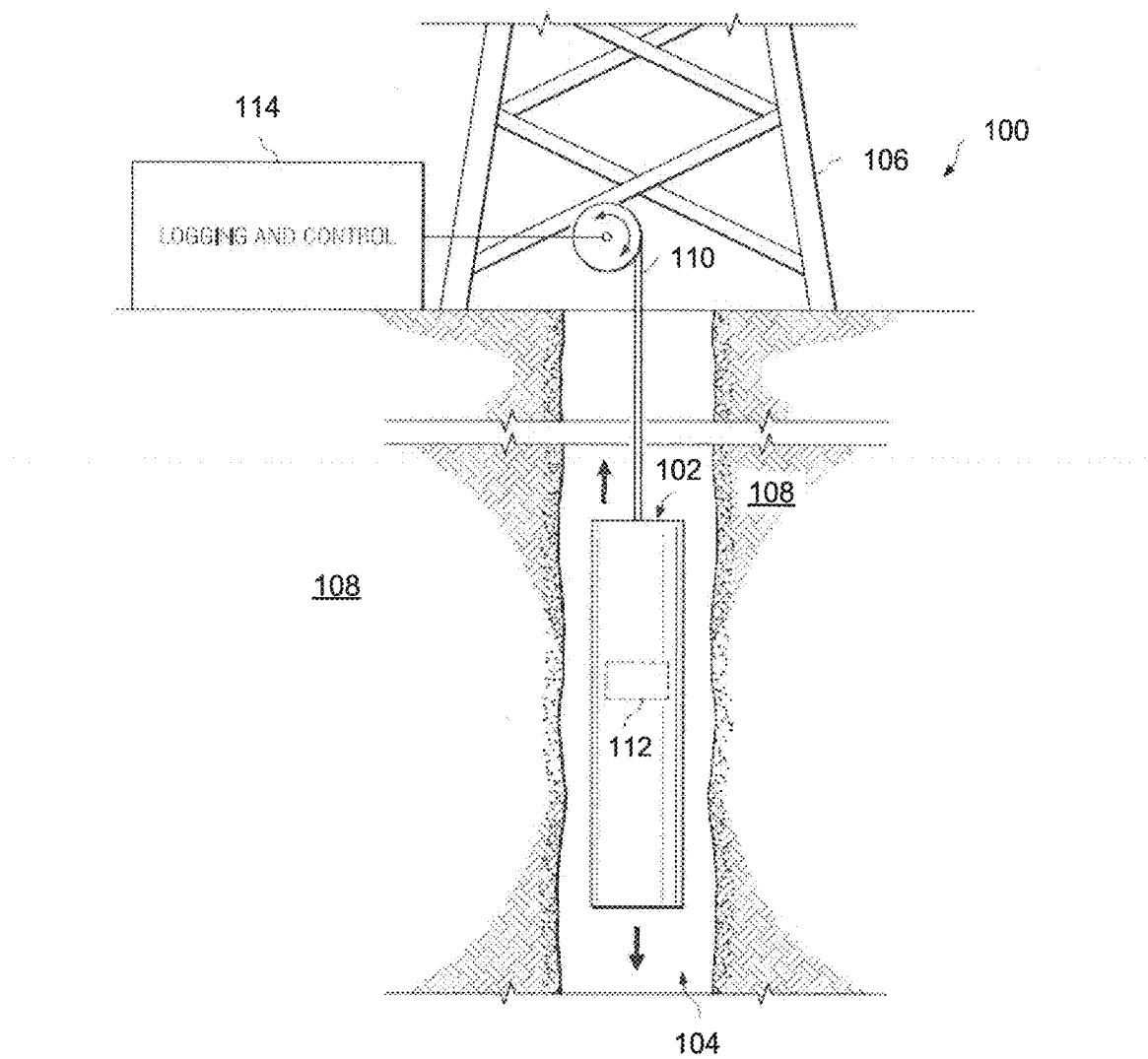
FIG. 1 is a schematic diagram of a wellsite system employing a downhole tool using electrically and mechanically joined components, in accordance with embodiments of the present disclosure.

It is emphasized that, in accordance with the standard practice in the industry, various features are not drawn to scale. In fact, the dimensions of the various features may be arbitrarily increased or reduced for clarity of discussion.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1 a wellsite system 100 may employ a downhole tool 102 at an onshore site. The skilled person will of course appreciate that the downhole can be employed at an offshore site. As depicted in FIG. 1, the downhole tool 102 may be suspended in a wellbore 104 from a rig 106, the wellbore 104 being formed in one or more subterranean formations 108. The downhole tool 102 may be or comprise an acoustic tool, a conveyance tool, a density tool, a downhole fluid analysis (DFA) tool, an electromagnetic (EM) tool, a fishing tool, a formation evaluation tool, a gravity tool, an intervention tool, a magnetic resonance tool, a monitoring tool, a neutron tool, a nuclear tool, a perforating tool, a photoelectric factor tool, a porosity tool, a reservoir characterization tool, a reservoir fluid sampling tool, a reservoir pressure tool, a reservoir solid sampling tool, a resistivity tool, a sand control tool, a seismic tool, a stimulation tool, a surveying tool, and/or a telemetry tool, although other downhole tools are also within the scope of the present disclosure.

The downhole tool 102 may be deployed from the rig 106 into the wellbore 104 via a conveyance means 110, which may be or comprise a wireline cable, a slickline cable, and/or coiled tubing, although other means for conveying the downhole tool 102 within the wellbore 104 are also within the scope of the present disclosure. As the downhole tool 102 operates, outputs of any number and/or type(s) of the downhole tool 102 and/or components thereof (one of which is designated by reference numeral 112) may be sent via, for example, telemetry to a logging and control system 114 at surface, and/or may be stored in any number and/or type(s) of memory(ies) for subsequent recall and/or processing after the downhole tool 102 is retrieved to surface.

Figure 2:
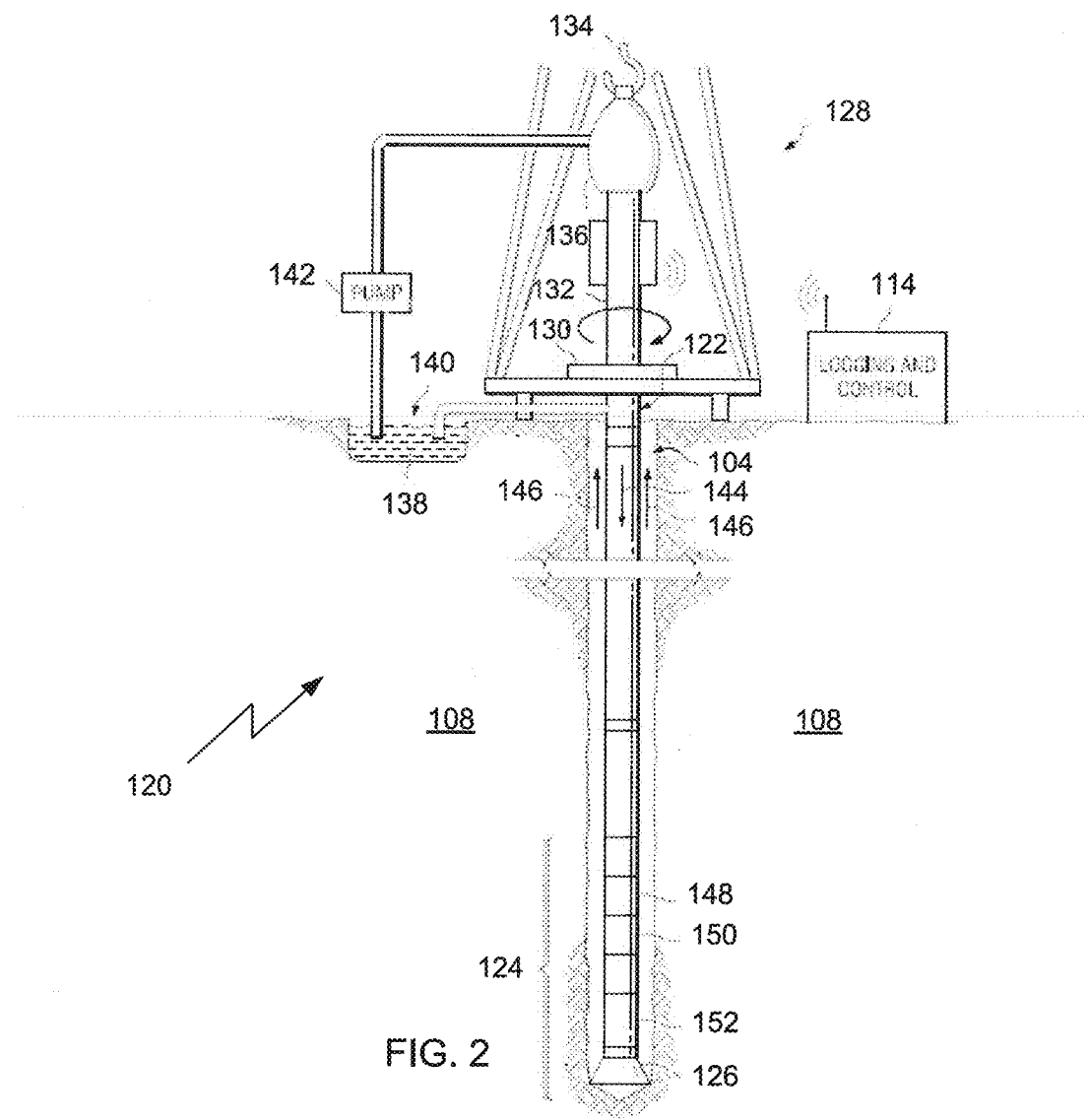
FIG. 2 is a schematic diagram of another wellsite system employing one or more downhole tools using electrically and mechanically joined components, in accordance with embodiments of the present disclosure.

Turning to FIG. 2, another wellsite system 120 that can be employed, for example at an onshore site, perhaps including at the same wellsite as depicted in FIG. 1. Of course, the skilled person will appreciate that the wellsite system 120 can be employed at an offshore site with appropriate modification. In this example, the wellbore 104 may have been formed in the one or more subsurface formations 108 by rotary and/or directional drilling. A conveyance means 122 suspended within the wellbore 104 may comprise or be connected to a bottom hole assembly (BHA) 124, which may have a drill bit 126 at its lower end. The conveyance means 122 may comprise drill pipe, wired drill pipe (WDP), tough logging conditions (TLC) pipe, coiled tubing, and/or other means of conveying the BHA 124 within the wellbore 104.

A surface sub-system of the wellsite system 120 may comprise a platform and derrick assembly 128 positioned over the wellbore 104, where such derrick may be substantially similar or identical to the rig 106 shown in FIG. 1. The assembly 128 may include a rotary table 130, a kelly 132, a hook 134, and/or a rotary swivel 136. The conveyance means 122 may be rotated by the rotary table 122, energized by means not shown, which may engage the kelly 132 at the upper end of the conveyance means 122. The conveyance means 122 may be suspended from the hook 134, which may be attached to a traveling block (not shown), and through the kelly 132 and the rotary swivel 136, which permits rotation of the conveyance means/drillstring 122 relative to the hook 134. Additionally, or alternatively, a top drive system may be used (not shown).

The surface sub-system may also include drilling fluid 138, which is commonly referred to in the industry as "mud", stored in a pit 140 formed at the well-site. A pump 142 may deliver the drilling fluid 138 to the interior of the conveyance means 122 via a port (not shown) in the swivel 136, causing the drilling fluid to flow downwardly through the conveyance means 122 as indicated by the directional arrow 144. The drilling fluid 138 may exit the conveyance means 122 via ports in the drill bit 126, and then circulate upwardly through an annulus region between the outside of the conveyance means 122 and the wall of the wellbore 104, as indicated by the directional arrows 146.

The drilling fluid 138 may be used to lubricate the drill bit 126, carry formation cuttings up to the surface as it is returned to the pit 140 for recirculation, and/or create a mudcake layer (not shown) on the walls of the wellbore 104. Although not depicted and/or described, one or more other circulation implementations are also within the scope of the present disclosure, such as a reverse circulation implementation in which the drilling fluid 138 is pumped down the annulus region (i.e., opposite to the directional arrows 146) to return to the surface within the interior of the conveyance means 122 (i.e., opposite to the directional arrow 144).

The BHA 124 may include any number and/or type(s) of downhole tools, schematically depicted in FIG. 2 as tools 148, 150, and 152. Examples of such downhole tools include an acoustic tool, a density tool, a directional drilling tool, a DFA tool, a drilling tool, an EM tool, a fishing tool, a formation evaluation tool, a gravity tool, an intervention tool, a logging while drilling (LWD) tool, a magnetic resonance tool, a measurement while drilling (MWD) tool, a monitoring tool, a mud logging tool, a neutron tool, a nuclear tool, a perforating tool, a photoelectric factor tool, a porosity tool, a reservoir characterization tool, a reservoir fluid sampling tool, a reservoir pressure tool, a reservoir solid sampling tool, a resistivity tool, a seismic tool, a stimulation tool, a surveying tool, a telemetry tool, and/or a tough logging condition (TLC) tool, although other downhole tools are also within the scope of the present disclosure.

The downhole tools 148, 150, and/or 152 may be housed in a special type of drill collar, as it is known in the art, and may include capabilities for measuring, processing, and/or storing information, as well as for communicating with the other downhole tools 148, 150, and/or 152, and/or directly with surface equipment, such as the logging and control system 114. Such communication may be supported by any conventional and/or future-developed two-way telemetry system, such as a mud-pulse telemetry system, a wired drill pipe telemetry system, an electromagnetic telemetry system, and/or an acoustic telemetry system, among others within the scope of the present disclosure. One or more of the downhole tools 148, 150, and/or 152 may also comprise an apparatus (not shown) for generating and/or providing electrical power for use by the BHA 124. Example devices to generate and/or provide electrical power include, but are not limited to, a battery system and a mud turbine generator powered by the flow of the drilling fluid 138.

The downhole tool 102 of FIG. 1 and/or one or more of the downhole tools 148, 150, and/or 152 of FIG. 2 may comprise a first component, a second component, and a solder electrically and mechanically coupling the first and second components, wherein the solder comprises from about 0.001 to about 1.0 weight % of copper, from about 2.5 to about 4.0 weight % of silver, from about 0.01 to about 0.25 weight % of manganese, and tin. For example, in one implementation, the solder comprises 0.48 weight % of copper, 2.99 weight % of silver, 0.17 weight % of manganese, and tin. In another implementation, the solder may consist of from about 0.001 to about 1.0 weight % of copper, from about 2.5 to about 4.0 weight % of silver, from about 0.01 to about 0.25 weight % of manganese, and tin, such that the solder comprises no other materials (with the possible exception of unavoidable impurities, contaminants, and the like). For example, the solder may consist of 0.48 weight % of copper, 2.99 weight % of silver, and 0.17 weight % of manganese, with the remainder being tin.

The solder may have a melting point of at least 150° C. For example, the solder may have a melting point of at least 200° C. In one or more implementations, the solder may have a melting point of at least 215° C. In one or more implementations within the scope of the present disclosure, the solder may have a melting point from 215° C. to 225° C.

Figure 3:
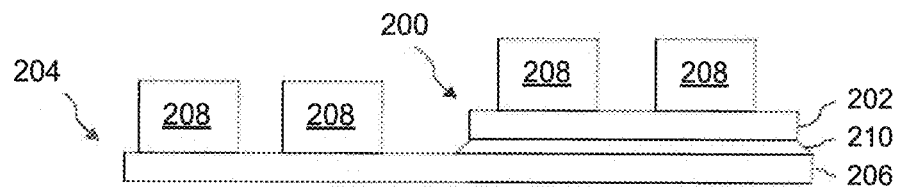
FIG. 3 is a schematic diagram of an electronic assembly constituting, in accordance with embodiments of the present disclosure.

Referring to FIG. 3, the first component 200 may comprise a substrate 202 and the second component 204 may comprise a substrate 206. Each of the substrates 202, 206 may carry one or more electrical components or devices, generally designated by reference numeral 208. Solder 210, which may be as described above, may be utilized to mechanically and electronically connect surfaces of the substrates 202, 206. The solder 210 may be applied as a liquid, solid, or paste. The first component substrate 202 and/or the second component substrate 206 may have surface finishes formed using one or more of electroplated nickel/gold, electroless nickel immersion gold (ENIG), Electroless Nickel/Electroless Gold (ENEG), Electrolytic Nickel/(Hard, Soft or Flash) Gold, Electroless Nickel/Electroless Palladium/Immersion Gold (ENEPIG), Electroless Nickel/Immersion Palladium/Immersion Gold (ENIPIG), organic solderability preservatives (OSP), immersion silver, immersion gold, immersion silver/gold, and/or immersion tin, although others are also within the scope of the present disclosure. The first component substrate 202 and/or the second component substrate 206 may comprise epoxy, bulk silicon, strained silicon, silicon germanium, and/or other materials, and may also be or comprise a silicon-on-insulator (SOI) substrate, such as a silicon-on-sapphire substrate, a silicon germanium-on-insulator substrate, and/or another substrate comprising an epitaxial semiconductor layer on an insulator layer.

Figure 4:
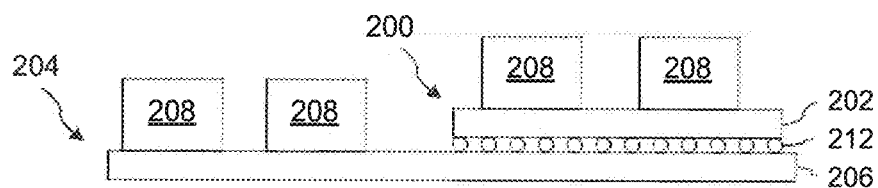
FIG. 4 is a schematic diagram of the electronic assembly of FIG. 3, employing solder balls, in accordance with embodiments of the present disclosure.
Figure 5:
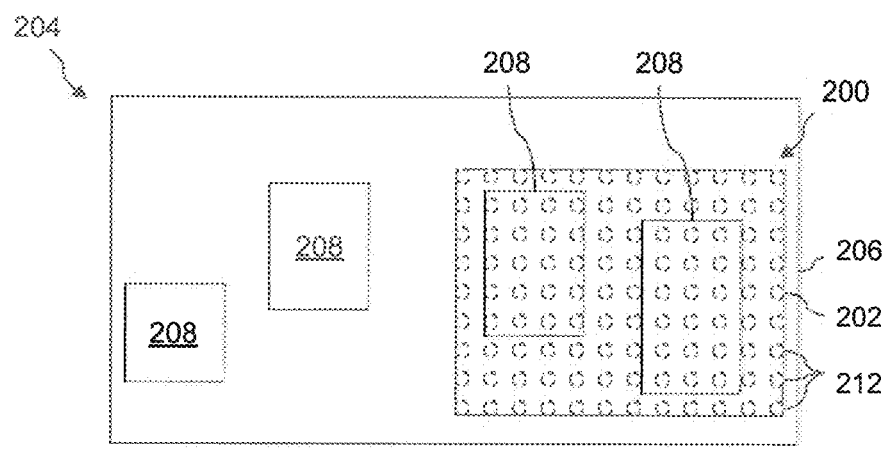
FIG. 5 is a plan view of the electronic assembly of FIG. 4.

Referring to FIG. 4, a similar implementation to that of FIG. 3 comprises a plurality of solder balls 212 are utilized instead of (or even in addition to) the solder 210 of FIG. 3, although it should be appreciated that the composition of the solder balls 212 may be as described above. For example, the solder balls 212 may be utilized as a 12×9 (or other size) Ball Grid Array (BGA), as more clearly depicted in the view of FIG. 5. Each solder ball 212 in the BGA may comprise about 50 mg of solder, although other amounts are also within the scope of the present disclosure.

In another example implementation (FIG. 6), the first component 200 comprises a component housing 220 and a connector rod/pin 222, a second component 221 comprises a conductor plate 224 attached to a circuit board or other substrate 226 (which may be substantially similar to one or more of the substrates described above), and a solder ball 228 comprising the solder described above connects the connector rod/pin 222 to the conductor plate 224. The solder ball 228 may be one solder ball of a BGA comprising a plurality of substantially similar solder balls. Prior to connecting the first component 200 to the substrate 226 constituting the second component 221, the solder ball 228 may be soldered onto the connector rod/pin 222. The first component 200 may then be positioned onto the substrate 226, and sufficient heating may be applied to the solder ball 228 for it to adhere to the conductor plate 224. However, other processes comprising these and/or other steps, including in an order or sequence other than described above, are also within the scope of the present disclosure.

Other implementations may also comprise utilizing an electrically conductive adhesive to connect the first and second components. In such implementations, the flexible nature of the adhesive may compensate for stresses and shock, such as by thermal expansion, and may prevent cracking or dislodging of the first and second components relative to one another. Referring to FIG. 7, an electrically conducting adhesive 230 may be applied between the solder ball 228 and the substrate 226. The adhesive 230 may be utilized instead of or in additional to the conductor plate 224 of FIG. 6. The adhesive 230 may comprise any conducting adhesive (including the conduction of electricity and/or thermal energy), and may comprise room temperature vulcanization (RTV), as well as metal-based adhesives such as silver conducting RTV, silver conducting adhesive, silver conducting epoxy, gold conducting adhesive, and gold conducting epoxy, among others within the scope of the present disclosure.

Figure 6:
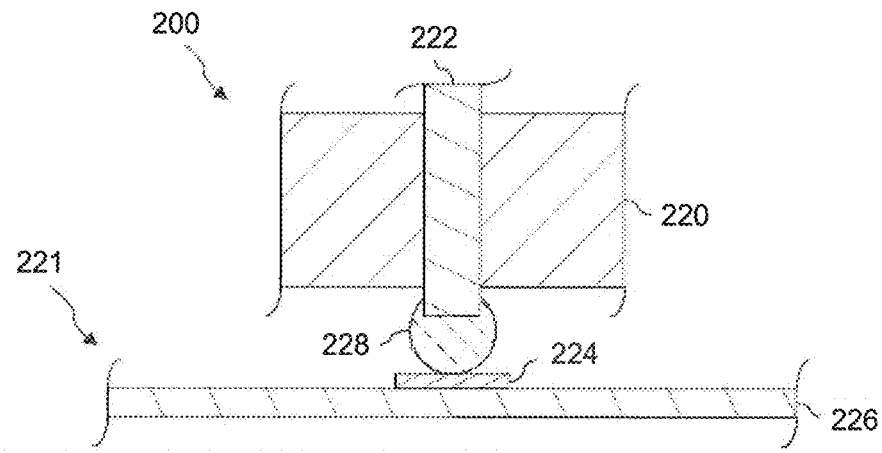
FIG. 6 is a schematic diagram of a section view of the electronic assembly of FIG. 4.
Figure 7:
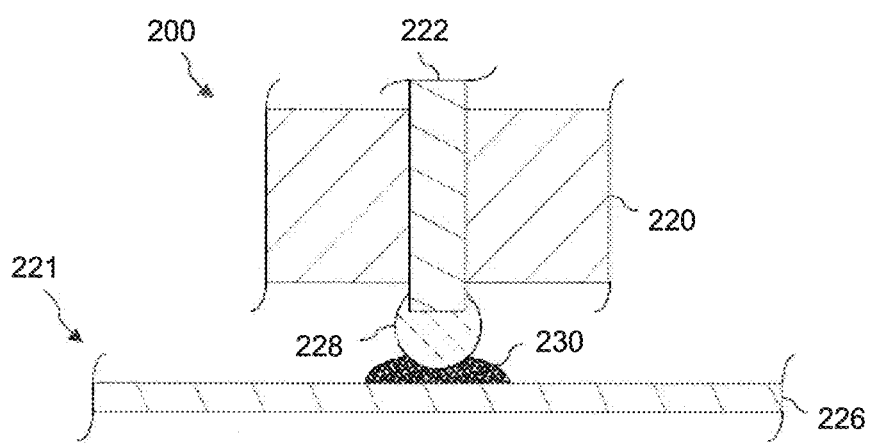
FIG. 7 is a schematic diagram of a section view of use of an alternative kind of soldering technique for the electronic assembly of FIG. 4.

In the example implementations depicted in FIGS. 6 and 7, the first component 200 may be an electrical component and the second component 221 may be or comprise a substrate, a circuit board, a printed circuit board (PCB), a hybrid board, a multi-chip module, and/or a connector (e.g., a terminal). For example, the first component 200 may comprise one or more of an analog-to-digital converter, an antenna, a capacitor, a charge pump, a connector, a controller, a cooling component, a digital logic gate, a digital-to-analog converter, a diode, a heating component, an inductor, an integrated circuit (IC) chip, a memory, a microelectromechanical system (MEMS), a microprocessor, a mixer, an operational amplifier, an oscillator, a programmable logic device (PLD), a receiver, a resistor, a sensor, a state machine, a switch, a temperature control component, a terminal, a transceiver, a transformer, a transistor, a voltage converter, a voltage reference, and/or another electrical device.

Figure 8:
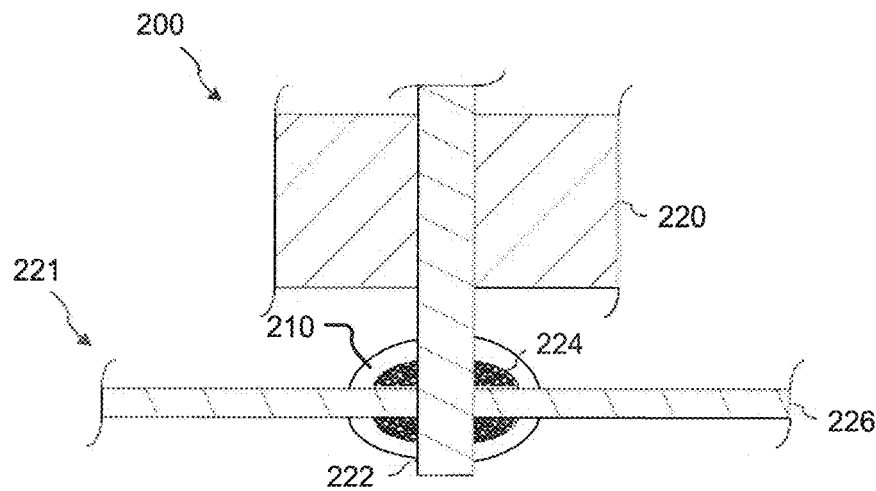
FIG. 8 is a schematic diagram of a section view of use of yet another kind of soldering technique for the electronic assembly of FIG. 4.

Referring to FIG. 8, in another implementation similar to those shown in FIGS. 6 and 7, the first component 200 comprises one or more connector rods/pins 222 extending through the substrate 226 constituting the second component 221. For example, apertures may be formed through the substrate 226 to accommodate the connector rods/pins 222 passing therethrough. Solder, composed as described above, may be used to mechanically and electrically connect surfaces of the rods/pins 212 and the substrate 226. Optionally, the electrically conducting adhesive 224 may be applied along the outer surface of the connector rods/pins 222 where they intersect the substrate 226; the solder 210 may be applied over the conducting adhesive 224.

Figure 9:
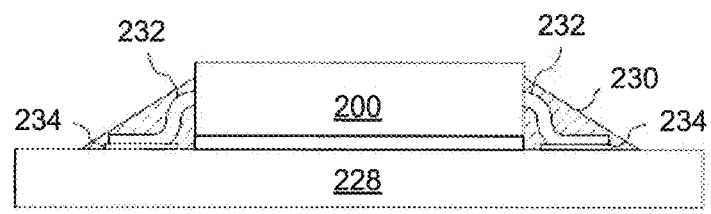
FIG. 9 is a schematic diagram of a surface mount component assembled to a printed wiring board or other substrate using solder, in accordance with embodiments of the present disclosure.

Turning to FIG. 9, the first component 200 is a surface mount component, the second component 228 is a substrate, and the first component 200 is mechanically and electrically coupled to the second component 228 by solder 230. The solder 230 may be as described above. The first component 200 may, for example, be an IC chip having a plurality of lead terminals 232 each corresponding to one of a plurality of solder lands 234 at the surface of the substrate 228. Each of the lead terminals 232 of the first component 200 may be electrically connected with the corresponding solder land 234 of the substrate 228 via the solder 230. The solder 230 and/or an under-fill material (not shown) may also fill the gap between the first component 200 and the substrate 228, perhaps surrounding all or a portion of one or more of the lead terminals 232.

Figure 10:
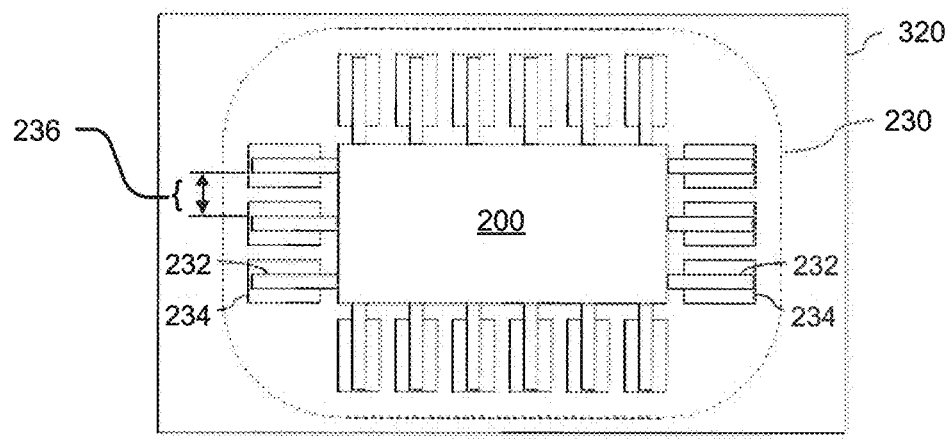
FIG. 10 is a plan view of the surface mount component of FIG. 9.

The first component 200 may be a fine pitch surface mount technology (SMT) IC chip, as shown in FIG. 10 (in this figure, the solder 230 is shown in phantom for the sake of clarity). The distance 236 between adjacent lead terminals 232 may range between about 0.5 mm and about 1.0 mm, although other value are also within the scope of the present disclosure. The first component 200 may be a Thin Quad Flat Package (TQFP), a Plastic Quad Flat Package (PQFP), a Quad-Flat-No-leads Package (QFN), and the like. The lead terminals 232 may substantially comprise copper or a copper alloy. For example, the lead terminals 232 may comprise CDA725 (Cu—Ni—Sn). The solder lands 234 may each be or comprise a solder pad, such as a tin solder pad and the like. The solder 232 may have a higher melting point than the high temperature environment that may be used for connecting the lead terminals 232 with the solder pads 234. The solder material may have its melting point equal to or higher than about 200 degrees Celsius.

Figure 11:
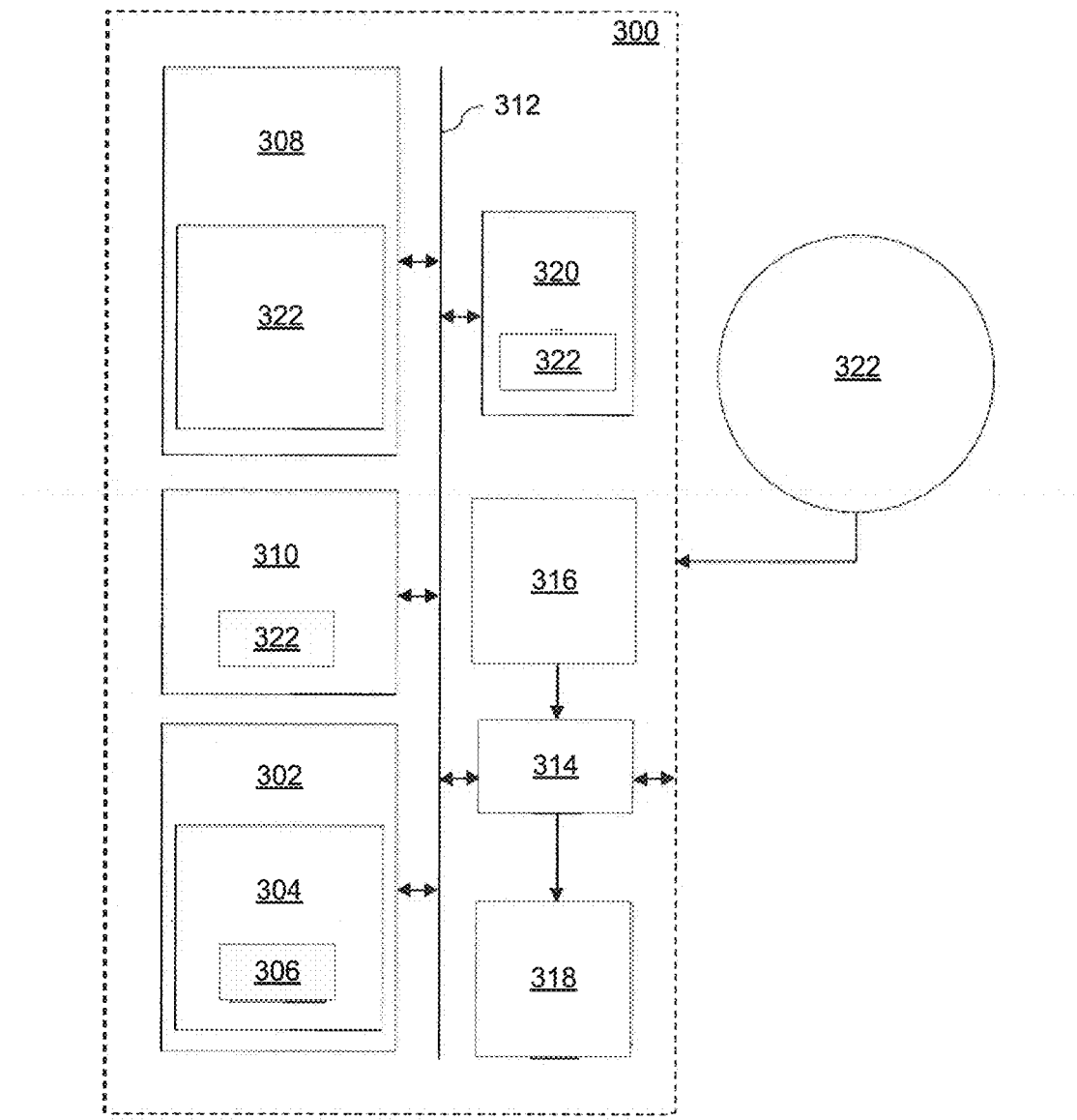
FIG. 11 is a block diagram of a computing apparatus circuit design implemented using an assembly joined with a solder, in accordance with embodiments of the present disclosure.

Referring to FIG. 11, an example processing system 300, which may execute example machine-readable instructions used to support implementation of one or more of the example downhole tools described herein, may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s). One or more of the components of the example processing system 300 may be assembled utilizing the above described solder, perhaps as shown in one or more of FIGS. 3-10, among other solder coupling methods within the scope of the present disclosure.

The system 300 comprises a processor 302 such as, for example, a general-purpose programmable processor. The processor 302 includes a local memory 304, and executes coded instructions 306 stored in the local memory 304 and/or in another memory device. The processor 302 may execute, among other things, machine-readable instructions to support the one or more example downhole tools described herein. The processor 302 may be, comprise or be implemented by any type of processing unit, such as one or more INTEL® microprocessors, one or more microcontrollers from the ARM® and/or PICO families of microcontrollers, one or more embedded soft/hard processors in one or more Field Programmable Gate Arrays (FPGAs), etc. Of course, other processors from other families are also appropriate.

The processor 302 is in communication with a main memory including a volatile (e.g., random access) memory 308 and a non-volatile (e.g., read only) memory 310 via a bus 312. The volatile memory 308 may be, comprise or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 310 may be, comprise or be implemented by flash memory and/or any other desired type of memory device. One or more memory controllers (not shown) may control access to the main memory 308 and/or 310.

The processing system 300 also includes an interface circuit 314. The interface circuit 314 may be, comprise or be implemented by any type of interface standard, such as an Ethernet interface, a universal serial bus (USB) and/or a third generation input/output (3GIO) interface, among others.

One or more input devices 316 are connected to the interface circuit 314. The input device(s) 316 permit a user to enter data and commands into the processor 302. The input device(s) may be, comprise or be implemented by, for example, a keyboard, a mouse, a touchscreen, a track-pad, a trackball, an isopoint and/or a voice recognition system, among others.

One or more output devices 318 are also connected to the interface circuit 314. The output devices 318 may be, comprise or be implemented by, for example, display devices (e.g., a liquid crystal display or cathode ray tube display (CRT), 314 others), printers and/or speakers, among others. Thus, the interface circuit 1124 may also comprise a graphics driver card.

The interface circuit 314 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 300 also includes one or more mass storage devices 320 for storing machine-readable instructions and data. Examples of such mass storage devices 320 include floppy disk drives, hard drive disks, compact disk drives and digital versatile disk (DVD) drives, among others.

The coded instructions 322 may be stored in the mass storage device 320, the volatile memory 308, the non-volatile memory 310, the local memory 304 and/or on a removable storage medium, such as a CD or DVD 322.

As an alternative to the implementation of FIG. 11, some of the elements described in relation to FIG. 11 may be embedded in an on-chip structure such as a processor and/or an ASIC (application specific integrated circuit) and/or an FDGA.

Experimental Procedure:

The experimental approach used to demonstrate the advantages of the Mn microalloyed SAC305 solder is comprised of a series of high temperature thermal cycling and mechanical shock loading conditions. The thermal cycling profile includes high and low temperatures that are usually experienced by electronics used in down-hole tools. The mechanical shock test includes a shock pulse that is usually experienced by electronics used in down-hole tools. In one experiment, electronic components (viz. Quad Flat No-lead 44 (QFN44) and Quad Flat No-lead 32 (QFN32)) were subjected to 20 thermal cycles (viz. −40° C. to 185° C. and from −40° C. to 200° C.) followed by 20,000 mechanical shocks.

Figure 12:
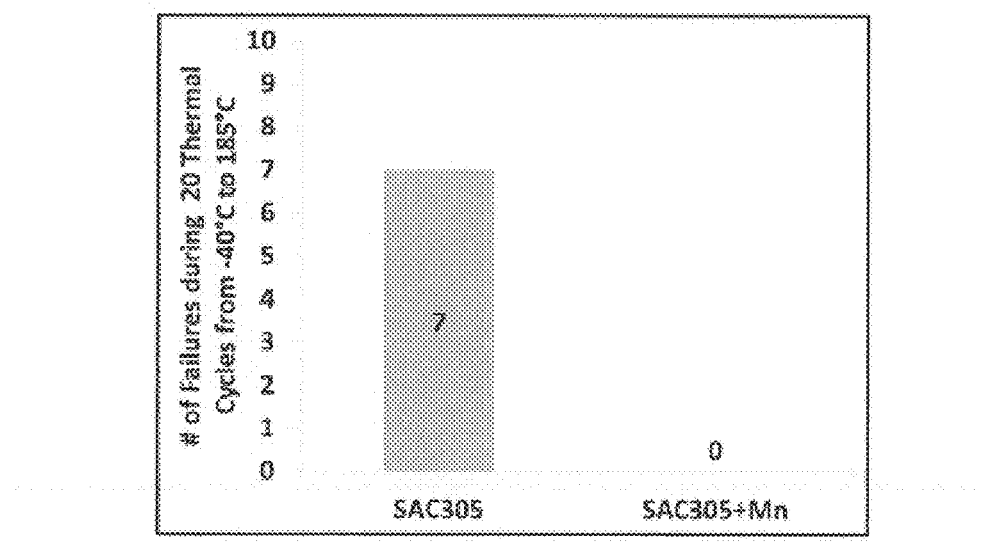
FIG. 12 is a comparative graph of the effect of Mn addition in an SnAgCu alloy in reducing the number of failures of packages over 20 thermal cycles from −40° C. to 185° C.

Test Results Discussion:

In one of the high temperature thermal cycling tests, a microalloy addition of 0.17% Mn to SAC305 solder was found to reduce the number of failures when compared to SAC305 in QFN44 packages during 20 thermal cycles from −40° C. to 185° C. as shown in FIG. 12.

Figure 13:
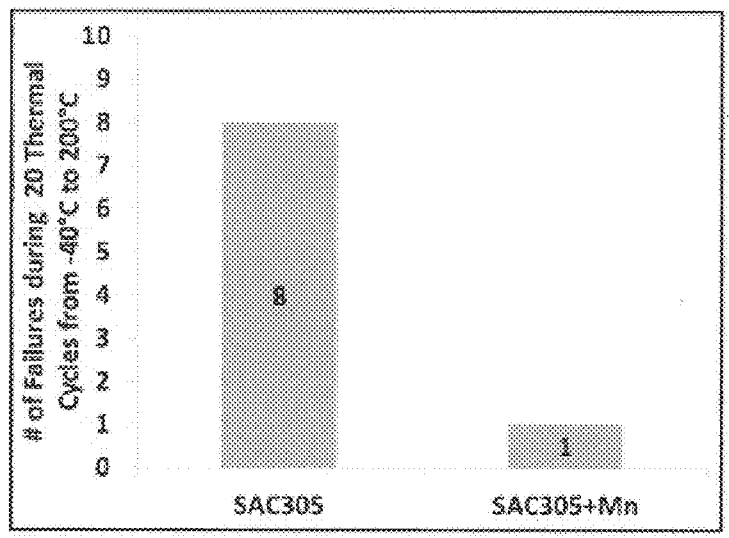
FIG. 13 is a comparative graph of the effect of Mn addition in an SnAgCu alloy in reducing the number of failures of packages over 20 thermal cycles from −40° C. to 200° C.

In another high temperature thermal cycle test, a microalloy addition of 0.17% Mn to SAC305 solder was found to reduce the number of failures when compared to SAC305 in QFN44 packages during 20 thermal cycles from −40° C. to 200° C. as shown in FIG. 13.

Figure 14:
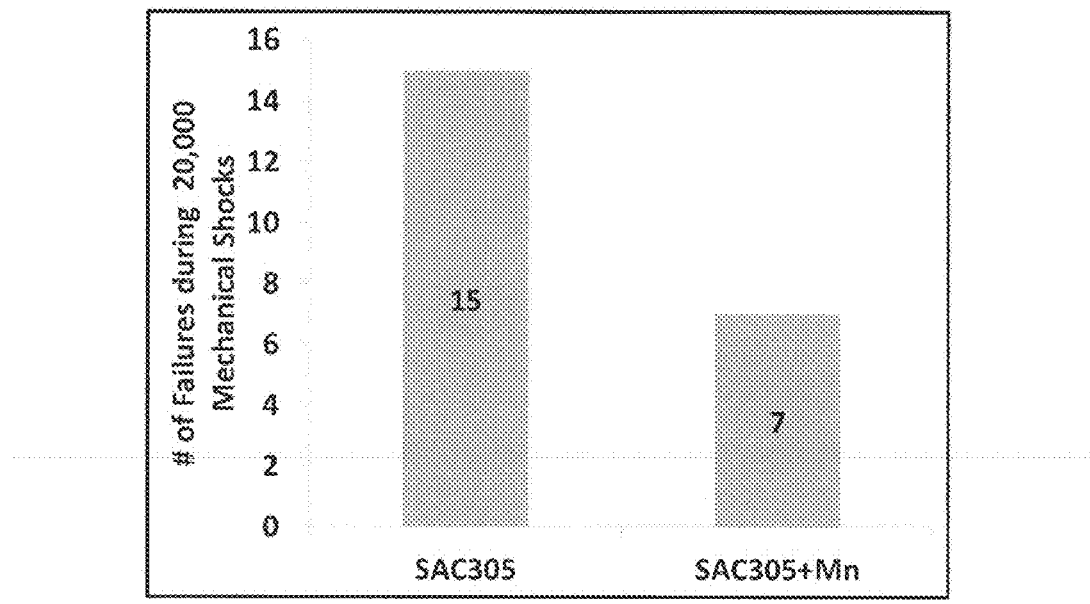
FIG. 14 is a comparative graph of the effect of Mn addition in an SnAgCu alloy in reducing the number of failures over 20,000 mechanical shocks on components after pre-exposure to 20 thermal cycles from −40° C. to 185° C.

In one of the mechanical shock tests performed on QFN32 packages after pre-exposure to 20 thermal cycles test from −40° C. to 185° C., a microalloy addition of 0.17% Mn with SAC305 solder was found to reduce the number of failures when compared to SAC305 during 20,000 mechanical shocks as shown in FIG. 14.

Figure 15:
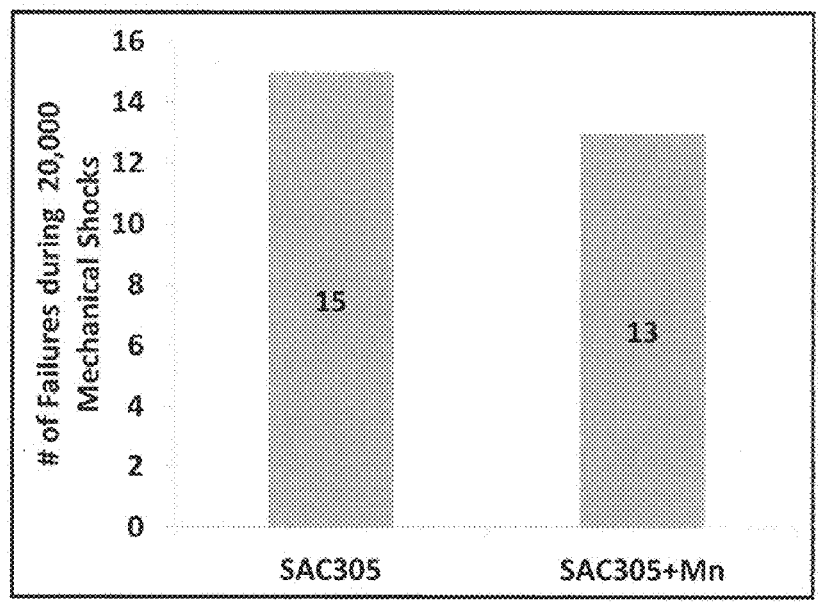
FIG. 15 is a comparative graph of the effect of Mn addition in an SnAgCu alloy in reducing the number of failures over 20,000 mechanical shocks on components after pre-exposure to 20 thermal cycles from −40° C. to 200° C.

In another mechanical shock test performed on QFN32 packages after pre-exposure to 20 thermal cycles test from −40° C. to 200° C., a microalloy addition of 0.17% Mn to SAC305 solder was found to reduce the number of failures when compared to SAC305 during 20,000 mechanical shocks as shown in FIG. 15.

Figure 16:
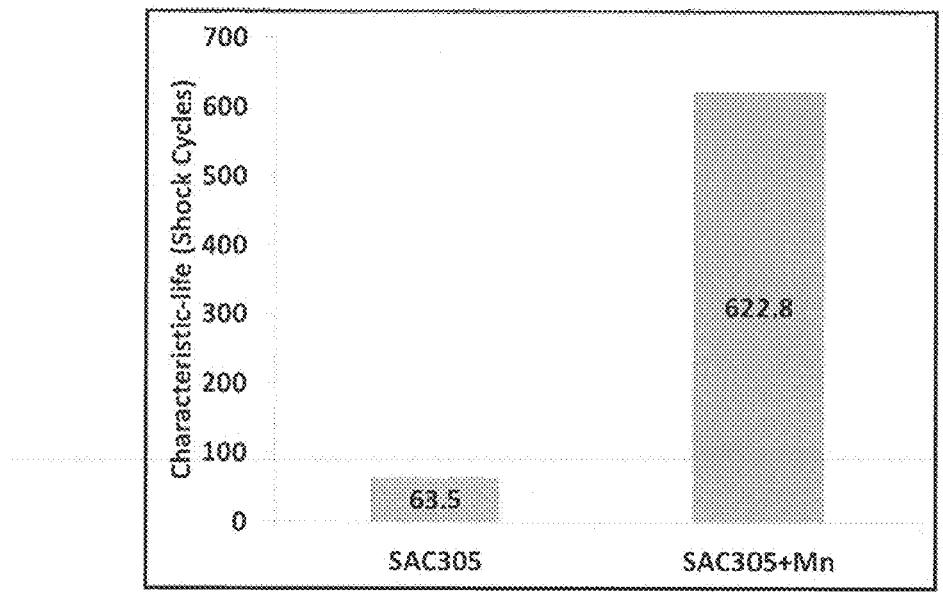
FIG. 16 is a comparative graph of the effect of Mn addition in an SnAgCu alloy in improving the characteristic life of QFN44 packages over 20,000 mechanical shocks after pre-exposure to 20 thermal cycles from −40° C. to 185° C.

QFN 44 packages using solder made by microalloy addition of Mn to SAC305 solder were found to have an improved characteristic-life over 20,000 mechanical shocks after pre-exposure to 20 thermal cycles from −40° C. to 185° C., as shown in FIG. 16.

Figure 17:
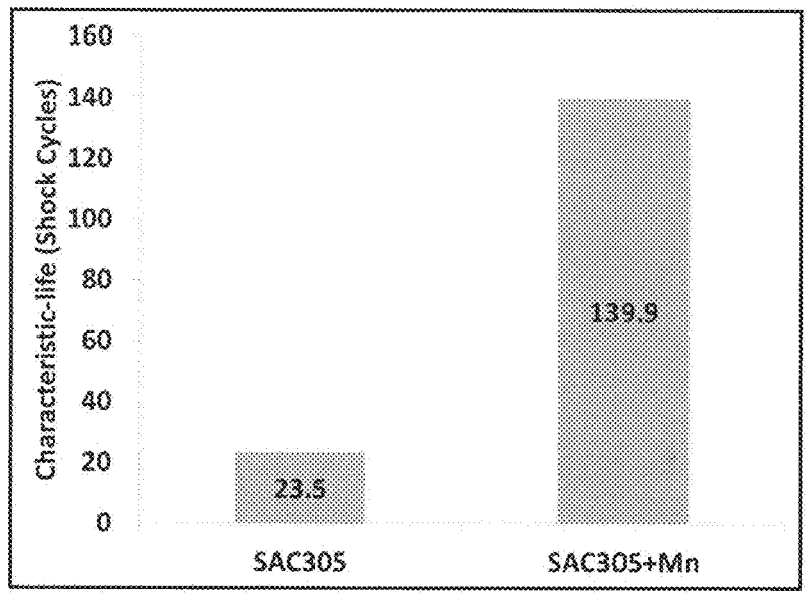
FIG. 17 is a comparative graph of the effect of Mn addition in an SnAgCu alloy in improving the characteristic life of QFN44 packages over 20,000 mechanical shocks after pre-exposure to 20 thermal cycles from −40° C. to 200° C.

QFN 44 packages using solder made by microalloy addition of Mn to SAC305 solder were also found to have an improved characteristic-life over 20,000 mechanical shocks after pre-exposure to 20 thermal cycles from −40° C. to 200° C., as shown in FIG. 17.

Figure 18:
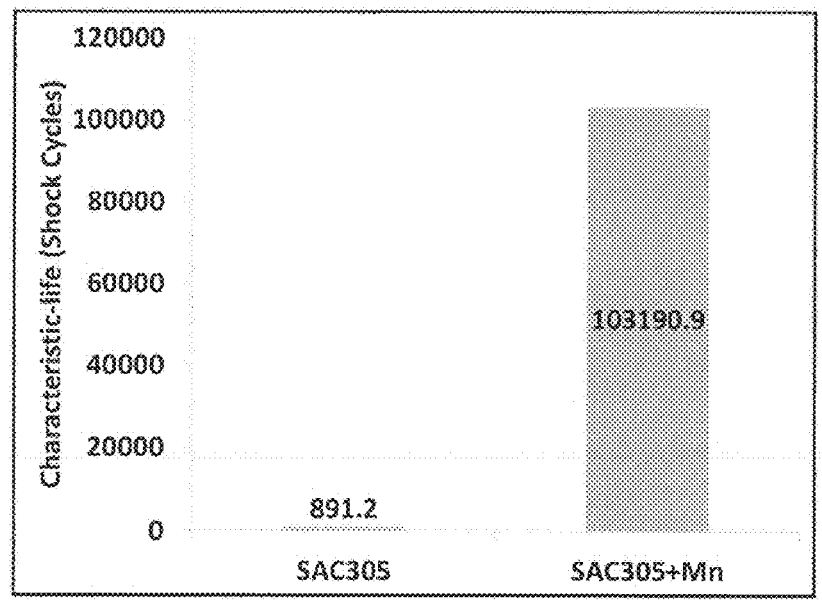
FIG. 18 is a comparative graph of the effect of Mn addition in an SnAgCu alloy in improving the characteristic life of QFN32 packages over 20,000 mechanical shocks after pre-exposure to 20 thermal cycles from −40° C. to 185° C.

QFN 32 packages using solder made by microalloy addition of Mn to SAC305 solder were found to have an improved characteristic-life over 20,000 mechanical shocks after pre-exposure to 20 thermal cycles from −40° C. to 185° C., as shown in FIG. 18.

Figure 19:
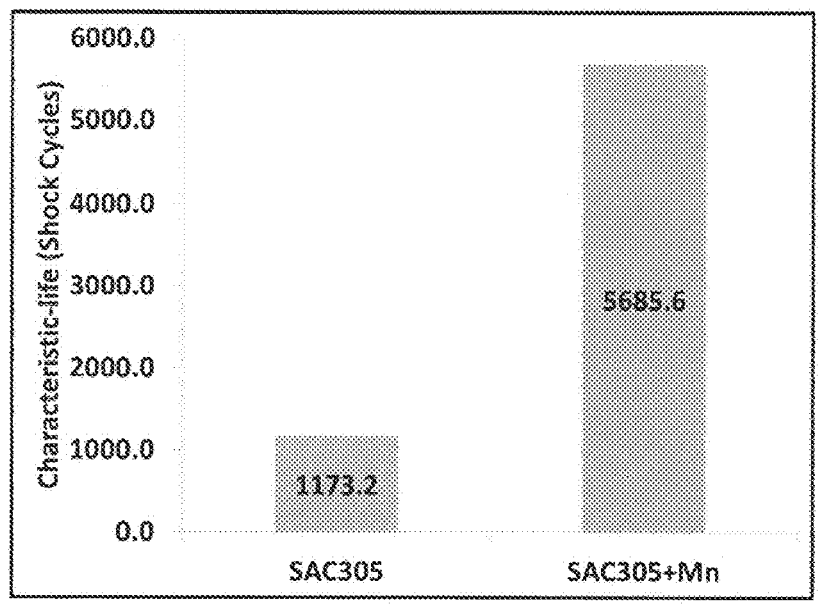
FIG. 19 is a comparative graph of the effect of Mn addition in an SnAgCu alloy in improving the characteristic life of QFN32 packages over 20,000 mechanical shocks after pre-exposure to 20 thermal cycles from −40° C. to 200° C.

QFN32 packages using solder made by microalloy addition of Mn to SAC305 solder were found to have an improved characteristic-life over 20,000 mechanical shocks after pre-exposure to 20 thermal cycles from −40° C. to 200° C., as shown in FIG. 19.

In the above examples, in addition to or as an alternative to the manganese doped solder employed, a layer of manganese or an alloy comprising manganese can be employed to provide protection for a diffusion barrier layer.

Figure 20:
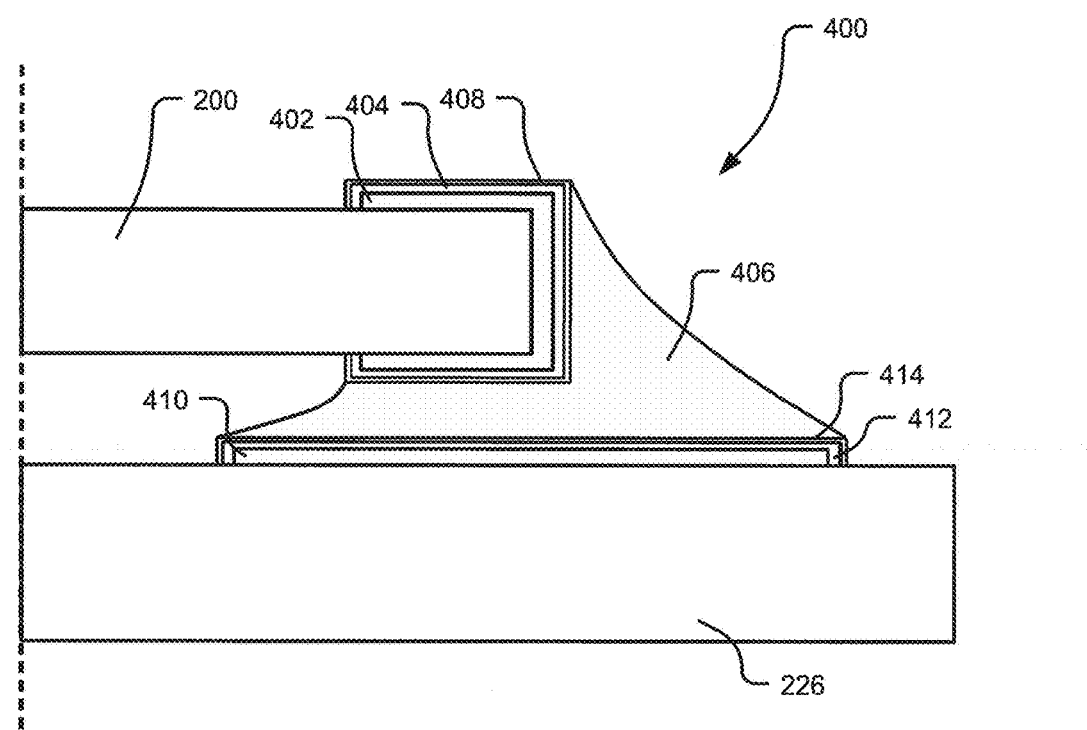
FIG. 20 is a schematic diagram of a solder joint, in accordance with embodiments of the present disclosure.

In this respect, referring to FIG. 20, a joint 400 may comprise a first component 200 electrically and mechanically connected to a substrate 226 constituting the second component. The first component 200 may comprise a first contact region 402 that may be electrically conductive and provided as a surface to which to solder in order to bring about the electrical and mechanical connection to the substrate 226. In this example, the first component 200 may be a surface mount device and may be finished with, for example, a first finish layer 404. The skilled person will appreciate though that the technique set forth in this example is applicable to both leaded Surface Mount Technology (SMT) as well as leadless SMT, or indeed other device/component mounting techniques, for example so-called "through-hole" mounting.

The first finish layer 404 may serve as a first diffusion barrier layer in order to protect the first contact region 402 from diffusion of the solder 406, in particular tin in the solder 406, by migration to and reaction with the first contact region 402. In this example, the first finish layer 404 may comprise nickel as the diffusion barrier material. In order to protect the diffusion barrier layer, a first layer of manganese 408 may be disposed upon the first finish layer 404 so that the first layer of manganese 408 may be adjacent the first finish layer 404.

The substrate 226 may also comprise, for example, a similar arrangement to that described above in relation to the first component 200. In this respect, the substrate 226 may comprise a second contact region 410 that is electrically conductive and provided as another surface to which to solder. The second contact region 410 may also be finished with, for example, a second finish layer 412, which may also serve as a second diffusion barrier layer in order to protect the second contact region 410 from diffusion of the solder 406, in particular tin in the solder 406, by migration to and reaction with the second contact region 410. The second finish layer 412 may also comprise nickel as the diffusion barrier material. In order to protect the second diffusion barrier layer, a second layer of manganese 414 may be disposed upon the second finish layer 412 so that the second layer of manganese 414 may be adjacent the second finish layer 412.

Figure 21:
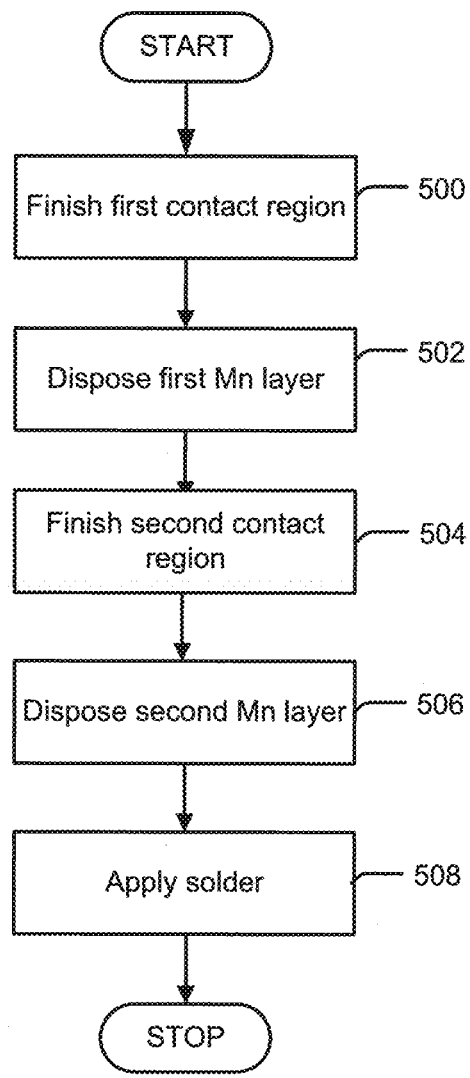
FIG. 21 is a flow diagram of a method of soldering, in accordance with embodiments of the present disclosure.

In this example, and referring to FIG. 21, the first contact region 402 may be finished (Step 500) by disposing the first finish layer 404 adjacent the first contact region 402 by way of any appropriate technique, for example using an electroless plating technique. The first layer of manganese 408 may then be disposed (Step 502) adjacent the first finish layer 404 using any suitable process, for example one or more of: electroless plating, electroplating, RF sputtering, or Chemical Vapour Deposition (CVD). In other embodiments, the first layer of manganese 408 can be disposed as a preform, a film, a powder or a sheet, and then subjected to a heating process in order to form the first layer of manganese 408. Such a heating process may be the same process as used to melt the solder 406, for example a reflow process, or may be a separate process.

Similarly, the second contact region 410 of the substrate 226 may be finished (Step 504) by disposing the second finish layer 412 by way of any appropriate technique, for example using an electroless plating technique. Thereafter, the second layer of manganese 414 may be disposed (Step 506) adjacent the second finish layer 412 using any suitable process, for example one or more of: electroless plating, electroplating, RF sputtering or Chemical Vapour Deposition (CVD). In other embodiments, the second layer of manganese 414 can be disposed as a preform, a film, a powder or a sheet, and then subjected to a heating process in order to form the second layer of manganese 414. Such a heating process may be the same process as used to melt the solder 406, for example a reflow process, or may be a separate process. Then, the joint 400 may be completed by applying (Step 508) any suitable solder, for example SAC305 or SAC305+Mn, between the first layer of manganese 408 and the second layer of manganese 414. In this example, the solder 406 is applied using a reflow technique. However, it should be appreciated that any suitable technique for applying the solder 406 may be employed, for example any of the techniques set forth above in relation to the preceding examples.

Although, in the above example, both the first component 200 and the second component, in the form of the substrate 226, carry the first and second layers of manganese 408, 414, respectively, the skilled person will appreciate that this may not be necessary depending upon application requirements. For example, one of either the first component 200 or the substrate 226 may not have the first layer of manganese 408 disposed adjacent the first finish layer 404 or the second layer of manganese 414 disposed adjacent the second finish layer 412, respectively.

The above example describes the use of layers of manganese being provided between the finish layers and the solder, for example the first layer of manganese 408 being disposed between the first finish layer 404 and the solder 406, and the second layer of manganese 414 being disposed between the second finish layer 412 and the solder 406. However, in another embodiment, the manganese can be provided by alloying. For example, the first finish layer 404 and/or the second finish layer 412 can be an alloy that comprises manganese. Additionally, or alternatively, the first contact region 402 and/or the second contact region 410 may be an alloy containing manganese, for example a copper-manganese alloy. The first contact region 402 and/or the second contact region 410 may be finished with a metallic finish layer, for example a layer of nickel or an alloy containing nickel, and optionally manganese. The joint 400 may then be completed using any suitable solder, for example SAC305 or SAC305+Mn.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same aspects of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus comprising:
   a downhole tool conveyable within a wellbore extending into a subterranean formation, wherein the downhole tool comprises:
     a first component;
     a second component; and
     a solder electrically and mechanically coupling the first and second components;
   and wherein:
     the first component comprises:
       an electrically conductive contact region finished with a metallic finish layer comprising nickel, wherein the metallic finish layer is configured to prevent diffusion of the solder and the conductive contact region; and
       a layer of manganese coupled with the finish layer; and
     the solder comprises copper, silver and tin and is disposed between the layer of manganese and the second component.

2. The apparatus according to claim 1, wherein the layer of manganese is disposed adjacent to or on top of the finish layer.

3. The apparatus according to claim 1, wherein the second component comprises:
   a further electrically conductive contact region finished with a further metallic finish layer; and
   a further layer of manganese disposed adjacent to the further finish layer, wherein the solder electrically and mechanically coupling the first and second components is coupled with the second component such that it is adjacent to the further layer of manganese.

4. The apparatus according to claim 1, wherein the solder has a melting point of 150° C. to 225° C.

5. The apparatus according to claim 1, wherein the solder has a melting point of 200° C. to 225° C.

6. The apparatus according to claim 1, wherein the solder has a melting point of 215° C. to 225° C.

7. The apparatus according to claim 1, wherein the solder has a melting temperature range from 215° C. to 225° C.

8. The apparatus according to claim 1, wherein the first component comprises a substrate and the second component comprises an integrated circuit chip.

9. The apparatus according to claim 1, wherein at least one of the first and second components comprises at least a portion of at least one of: an analog-to-digital converter; an antenna; a capacitor; a charge pump; a connector; a controller; a cooling component; a digital logic gate; a digital-to-analog converter; a diode; a heating component; an inductor; an integrated circuit chip; a memory; a microelectromechanical system (MEMS); a microprocessor; a mixer; an operational amplifier; an oscillator; a programmable logic device (PLD); a receiver; a resistor; a sensor; a state machine; a switch; a temperature control component; a terminal; transceiver; a transformer; a transistor; a voltage converter; a voltage reference; or another electrical device.

10. The apparatus according to claim 1, wherein the downhole tool comprises at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; or a tough logging condition (TLC) tool.

11. The apparatus according to claim 1, wherein the downhole tool is conveyable within the wellbore by at least one of coiled tubing, drill pipe, slickline, wired drill pipe (WOP), or wireline.

12. The apparatus according to claim 1, wherein the downhole tool comprises at least one of a cased-hole tool or an open-hole tool.

13. The apparatus according to claim 1, wherein the solder comprises from 0.001 to 1 percent, based on total weight of the solder, of copper; from 2.5 to 4 percent, based on total weight of the solder, of silver; from 0.01 to 0.25 percent, based on total weight of the solder, of manganese; and tin.

14. The apparatus according to claim 13, wherein the solder alloy consists essentially of from 0.001 to 1.0 percent, based on total weight of the solder, of copper; from 2.5 to 4.0 percent, based on total weight of the solder, of silver; from 0.01 to 0.25 percent, based on total weight of the solder, of manganese; and tin.

15. An apparatus comprising:
a downhole tool conveyable within a wellbore extending into a subterranean formation, wherein the downhole tool comprises:
a first component;
a second component; and
a solder electrically and mechanically coupling the first and second components; wherein
the first component comprises an electrically conductive contact region, and a metallic finish layer disposed on the electrically conductive contact region, the metallic finish layer comprising nickel and configured to prevent diffusion of the solder and the contact region, and a manganese layer positioned between the finish layer and the solder; and
the solder is disposed between the manganese layer and the second component, and wherein the solder comprises copper, silver and tin.

16. The apparatus according to claim 15, wherein the second component comprises:

another electrically conductive contact region finished with another metallic finish layer comprising nickel and manganese, and wherein the solder is adjacent the another finish layer.

17. The apparatus according to claim 15, wherein the second component comprises:
another electrically conductive contact region finished with another metallic finish layer; and
a layer of manganese adjacent the another finish layer, and wherein the solder is adjacent the layer of manganese.

18. The apparatus according to claim 15, wherein the solder has a melting point of 150° C. to 225° C.

19. The apparatus according to claim 15, wherein the solder has a melting point of 200° C. to 225° C.

20. The apparatus according to claim 15, wherein the solder has a melting point of 215° C. to 225° C.

21. The apparatus according to claim 15, wherein the solder has a melting temperature range from 215° C. to 225° C.

22. The apparatus according to claim 15, wherein the first component comprises a substrate and the second component comprises an integrated circuit chip.

23. The apparatus according to claim 15, wherein at least one of the first and second components comprises at least a portion of at least one of an analog-to-digital converter; an antenna; a capacitor; a charge pump; a connector; a controller; a cooling component; a digital logic gate; a digital-to-analog converter; a diode; a heating component; an inductor; an integrated circuit chip; a memory; a microelectromechanical system (MEMS); a microprocessor; a mixer; an operational amplifier; an oscillator; a programmable logic device (PLD); a receiver; a resistor; a sensor; a state machine; a switch; a temperature control component; a terminal; a transceiver; a transformer; a transistor; a voltage converter; a voltage reference; or another electrical device.

24. The apparatus according to claim 15, wherein the downhole tool comprises at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; or a tough logging condition (TLC) tool.

25. The apparatus according to claim 15, wherein the downhole tool is conveyable within the wellbore by at least one of coiled tubing, drill pipe, slickline, wired drill pipe (WOP), or wireline.

26. The apparatus according to claim 15, wherein the downhole tool comprises at least one of a cased-hole tool or an open-hole tool.

27. The apparatus according to claim 15, wherein the solder comprises:
from 0.001 to 1 percent, based on total weight of the solder, of copper;
from 2.5 to 4 percent, based on total weight of the solder, of silver;

from 0.01 to 0.25 percent, based on total weight of the solder, of manganese; and tin.

28. The apparatus according to claim 27, wherein the solder alloy consists essentially of:

from 0.001 to about 1.0 percent, based on total weight of the solder, of copper;

from 2.5 to 4.0 percent, based on total weight of the solder, of silver;

from 0.01 to 0.25 percent, based on total weight of the solder, of manganese; and tin.

29. An apparatus comprising:

a downhole tool conveyable within a wellbore extending into a subterranean formation, wherein the downhole tool comprises:

a first component;

a second component; and a solder electrically and mechanically coupling the first and second components;

wherein the first component comprises:

an electrically conductive contact region formed from an alloy containing manganese and the electrically conductive region is finished with a metallic finish layer comprising nickel, such that the metallic finish layer is configured to prevent diffusion of the solder and the contact region; and a layer of manganese disposed adjacent to the finish layer; and the solder is disposed between the finish layer and the second component and the solder comprises copper, silver and tin.

30. The apparatus of claim 1, wherein the first component comprises a rod, the second component comprises a circuit board, and the electrically conductive contact region covers an end of the rod, such that the contact region both faces and faces away from the circuit board, and wherein the metallic finish layer and the layer of manganese entirely cover the contact region.

* * * * *